US012643663B2

(12) United States Patent
Warwick et al.

(10) Patent No.: US 12,643,663 B2
(45) Date of Patent: Jun. 2, 2026

(54) PASSENGER SEAT WITH DECOUPLING MOTION MECHANISM FOR REDUCED MOBILITY SEATING

(71) Applicant: B/E Aerospace, Inc., Winston-Salem, NC (US)

(72) Inventors: Michael Warwick, Pleasant Garden, NC (US); Twinkle Jacob, Winston-Salem, NC (US); Charles Cline, High Point, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 198 days.

(21) Appl. No.: 18/437,601

(22) Filed: Feb. 9, 2024

(65) Prior Publication Data

US 2025/0256849 A1 Aug. 14, 2025

(51) Int. Cl.
B64D 11/06 (2006.01)
A61G 3/00 (2006.01)

(52) U.S. Cl.
CPC .............. B64D 11/064 (2014.12); A61G 3/00 (2013.01); B64D 11/0601 (2014.12)

(58) Field of Classification Search
CPC .......... B60N 2/06; B60N 2/2213; B60N 2/22; B60N 2/23; B60N 2/231; B61D 33/0021; B64D 11/0641; B64D 11/0601
See application file for complete search history.

(56) References Cited

U.S. PATENT DOCUMENTS

| | | | |
|---|---|---|---|
| 5,174,526 | A | 12/1992 | Kanigowski |
| 6,305,644 | B1 | 10/2001 | Beroth |
| 6,478,256 | B1 | 11/2002 | Williamson |
| 7,309,095 | B2 | 12/2007 | O'connor |
| 7,320,501 | B2 | 1/2008 | Keyser et al. |
| 7,578,471 | B2 | 8/2009 | Beroth |
| 7,665,693 | B2 | 2/2010 | Bettell |
| 9,022,320 | B2 | 5/2015 | Wallace et al. |

(Continued)

FOREIGN PATENT DOCUMENTS

| | | |
|---|---|---|
| WO | 2020205858 A1 | 10/2020 |
| WO | 2022251727 A1 | 12/2022 |

OTHER PUBLICATIONS

U.S. Appl. No. 63/002,067, filed Mar. 30, 2020, B/E Aerospace, Inc.

(Continued)

*Primary Examiner* — Joshua D Huson
(74) *Attorney, Agent, or Firm* — Suiter Swantz IP

(57) ABSTRACT

A passenger seat for facilitating seating passengers with reduced mobilities (PRM) in a conveyance such as an aircraft. The passenger seat includes a motion subassembly and a decoupling mechanism configured to couple the motion assembly to the seat back, and decouple the motion assembly from the seat back to lock the seat back in an upright position such that the passenger seat can be translated forward to a position nearer, for example, an aisle. In use, decoupling and seat back locking occur in a synchronous manner, as does coupling and seat back unlocking action thereby allowing seat back recline motion. In embodiments, the passenger seat includes a manual release lever for actuating the decoupling mechanism to decouple the seat back motion subassembly.

17 Claims, 10 Drawing Sheets

100⌐

(56) References Cited

U.S. PATENT DOCUMENTS

| | | | |
|---|---|---|---|
| 9,187,178 B2 | 11/2015 | Round et al. | |
| 9,493,240 B2 | 11/2016 | Round et al. | |
| 9,828,100 B2 | 11/2017 | Wyss et al. | |
| 9,981,571 B2 | 5/2018 | Garing et al. | |
| 10,486,814 B2 | 11/2019 | Texeraud et al. | |
| 10,696,191 B2 | 6/2020 | Does | |
| 10,773,804 B2 | 9/2020 | Valdes De La Garza et al. | |
| 10,829,222 B2 | 11/2020 | De La Garza et al. | |
| 10,870,489 B2 | 12/2020 | Dowty et al. | |
| 11,059,587 B2 | 7/2021 | Finlay et al. | |
| 11,299,274 B1 | 4/2022 | Davis et al. | |
| 11,401,038 B1 | 8/2022 | Warwick et al. | |
| 11,427,327 B2 | 8/2022 | Pence et al. | |
| 11,485,498 B2 | 11/2022 | Bunea et al. | |
| 11,492,123 B2 | 11/2022 | Jacob et al. | |
| 11,753,170 B2 | 9/2023 | Pence et al. | |
| 2003/0080597 A1 | 5/2003 | Beroth et al. | |
| 2007/0145806 A1* | 6/2007 | Wilder | B64D 11/0641 297/423.32 |
| 2008/0001457 A1* | 1/2008 | Reed | B60N 2/06 297/361.1 |
| 2008/0088160 A1 | 4/2008 | Johnson | |
| 2011/0095584 A1* | 4/2011 | Tomida | B60N 2/0296 74/89.14 |
| 2013/0113250 A1 | 5/2013 | Udriste | |
| 2015/0130244 A1 | 5/2015 | Wyss et al. | |
| 2017/0008632 A1 | 1/2017 | Eberle et al. | |
| 2017/0334320 A1* | 11/2017 | Heeg | B60N 2/235 |
| 2022/0204165 A1 | 6/2022 | Chilcott et al. | |
| 2022/0258865 A1 | 8/2022 | Wills | |
| 2022/0402609 A1 | 12/2022 | Warwick et al. | |
| 2022/0402612 A1 | 12/2022 | Davis et al. | |
| 2023/0002056 A1* | 1/2023 | Rousse | B64D 11/0641 |
| 2023/0064972 A1 | 3/2023 | Dowty et al. | |
| 2023/0322389 A1 | 10/2023 | Davis et al. | |
| 2023/0365261 A1 | 11/2023 | Yates | |

OTHER PUBLICATIONS

European Search Report received in EP Application No. 25156918.
2, Apr. 14, 2025, 7 pages.

* cited by examiner

PASSENGER SEAT WITH DECOUPLING MOTION MECHANISM FOR REDUCED MOBILITY SEATING

TECHNICAL FIELD AND BACKGROUND

The present disclosure relates generally to passenger seat assemblies for conveyances such as aircraft, and more particularly, to a reclinable passenger seat including a motion subassembly configured to be temporarily decoupled from the seat back assembly in order to lock the seat back assembly in an upright and fore position to facilitate seating a passenger with reduced mobility (PRM).

Conveyances such as aircraft include different seating classes including different types of passenger seats. For example, traditional economy seating classes include passenger seats with limited seat back recline, whereas traditional premium seating classes include highly adjustable passenger seats such as those configured to form a bed. Another differentiator between seating classes includes the position of the passenger seats relative to an aisle (e.g., longitudinal aisle). For example, traditional economy seating classes include at least some seats positioned adjacent and parallel to an aisle, whereas traditional premium seating classes include seats that are angled and spaced apart from an aisle.

Aircraft and other conveyances are subject to rules pertaining to accommodating persons with reduced mobility (PRM). Typically, when seating a PRM on an aircraft, a transfer wheelchair is positioned to one side of a passenger seat such that the PRM can be moved laterally into the seat, with assistance from the flight crew. In the case of angled passenger seats and those positioned at a distance from the aisle, seat transfer is more difficult and invites injury to the PRM and the flight crew. Current solutions for gaining access to an angled seats include temporary adjustments in the space surrounding the passenger seat. Such solutions are highly specific to the cabin configuration and surrounding furniture, and thus are difficult and costly to implement.

Therefore, what is needed is a solution for temporarily decreasing the passenger seat distance from an aisle to facilitate seating a PRM.

BRIEF SUMMARY

In one aspect, embodiments of the inventive concepts disclosed herein are directed to a passenger seat assembly including a floor track and a passenger seat mounted for linear translation along the floor track between a fore position and an aft position. In embodiments, the passenger seat includes a frame subassembly, a seat pan subassembly mounted to the frame subassembly, a seat back subassembly pivotably mounted to the frame subassembly, a motion subassembly mounted to the frame subassembly, and a decoupling mechanism. In use, when the motion subassembly is coupled to the seat back subassembly, by the decoupling mechanism being in a coupled state, the motion subassembly is configured to move the seat back subassembly between a first upright position and a reclined position, and when the motion subassembly is decoupled from the seat back subassembly, by the decoupling mechanism being in a decoupled state, the seat back subassembly is configured to be locked in a second upright position and the passenger seat is configured to be translated to the fore position to facilitate seating a passenger with reduced mobility (PRM).

In some embodiments, the frame subassembly includes spaced upright frame members mounted for linear translation along the floor track, the passenger seat is mounted between the spaced upright frame members, and the seat back assembly is pivotably mounted to the spaced upright frame members.

In some embodiments, the motion subassembly includes a sector gear mounted to a rotatable sector wheel, an adjustable pin mounted to the rotatable sector wheel, a depressible button configured to interact with the adjustable pin, a lockable gas strut coupled between the seat back subassembly and the frame subassembly, and a cable operatively connecting the depressible button to the lockable gas strut.

In some embodiments, the cable of the motion subassembly includes a translating inner cable having a first end attached to a bell crank configured to interact with the depressible button, and a second end attached to a lever interacting with a locking pin of the lockable gas strut, such that in use, pulling the first end of the cable causes the locking pin to disengage from the lockable gas strut, and releasing the first end of the cable causes the locking pin to engage the lockable gas strut, and action of the depressible button and action of the lever occur in a synchronous manner.

In some embodiments, when the motion subassembly is coupled to the seat back subassembly, by the decoupling mechanism being in the coupled state, the adjustable pin is in contact with the depressible button and the lockable gas strut is in an unlocked state permitting linear translation of the lockable gas strut, and when the motion subassembly is decoupled from the seat back subassembly, by the decoupling mechanism being in the decoupled state, the adjustable pin is out of contact with the depressible button and the lockable gas strut is in a locked state preventing linear translation of the lockable gas strut.

In some embodiments, the decoupling mechanism includes a latch mounted to the seat back subassembly, a catch mounted to the motion subassembly, the catch configured to retain the latch, a release handle mounted to the seat back assembly, and a cable operatively connecting the release handle to the catch. In use, pulling the release handle causes the catch to release the retained latch.

In some embodiments, the cable includes a translating inner cable wherein one end of the translating inner cable is attached to the release handle, and an opposing end of the translating cable is attached to a first rotating lever. In some embodiments, the catch includes a second rotating lever configured to be rotated by rotational action of the first rotating lever, a third rotating lever configured to be rotated by rotational action of the second rotating lever, and a pawl configured to be rotated to an open position by rotational action of the third rotating lever, wherein the open position corresponds to a release state of the decoupling mechanism.

In some embodiments, the second upright position is equal to or more vertical than the first upright position.

In some embodiments, a distance between the fore position and the aft position is at least 15 inches.

According to another aspect, the inventive concepts according to the present disclosure are directed to a seat configuration for an aircraft cabin including an aisle and a passenger seat assembly positioned facing and at an angle to the aisle. In embodiments, the passenger seat assembly includes a floor track and a passenger seat mounted for linear translation along the floor track between a fore position proximal to the aisle and an aft position distal from the aisle. In embodiments, the passenger seat includes a frame subassembly, a seat pan subassembly mounted to the frame subassembly, a seat back subassembly pivotably mounted to the frame subassembly, a motion subassembly mounted to the frame subassembly, and a decoupling mechanism. In use, when the motion subassembly is coupled to the seat back subassembly, by the decoupling mechanism being in a coupled state, the motion subassembly is configured to move the seat back subassembly between a first upright position and a reclined position, and when the motion subassembly is decoupled from the seat back subassembly, by the decoupling mechanism being in a decoupled state, the seat back subassembly is configured to be locked in a second upright position and the passenger seat is configured to be translated to the fore position to facilitate seating a passenger with reduced mobility (PRM).

According to a further aspect, the inventive concepts according to the present disclosure are directed to an aircraft passenger seat assembly for facilitating seating a passenger with reduced mobility (PRM), wherein the passenger seat mounted for linear translation between a fore position and an aft position, and the passenger seat is configured to be temporarily decoupled from its seat back motion mechanism.

Embodiments of the inventive concepts can include one or more or any combination of the above aspects, features and configurations.

BRIEF DESCRPTION OF THE DRAWINGS

Implementations of the inventive concepts disclosed herein may be better understood when consideration is given to the following detailed description thereof. Such description refers reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
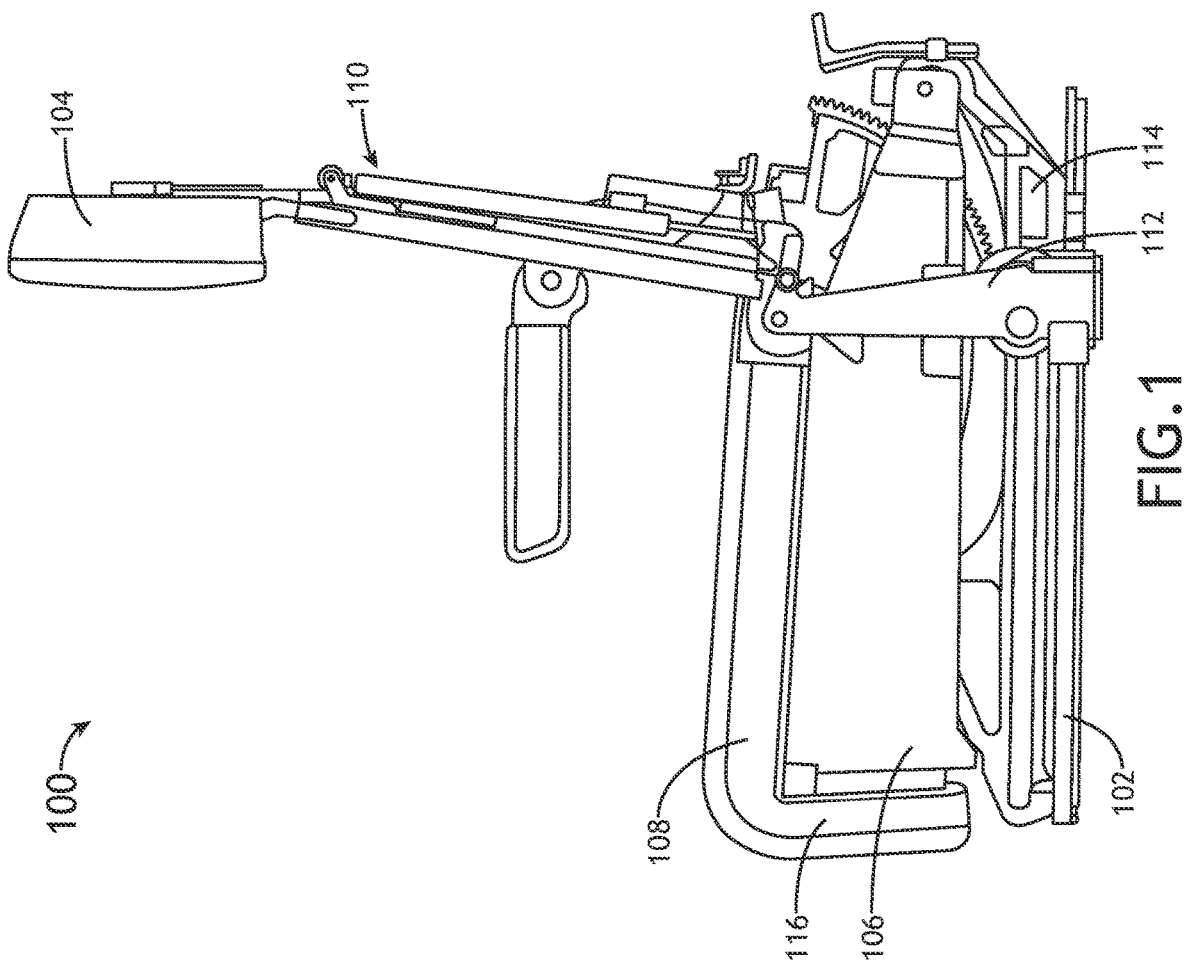
FIG. 1 is a side view of a passenger seat assembly shown in an upright position for taxi, takeoff, and landing (TTOL), in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a passenger seat assembly for facilitating PRM seat transfer and loading. In embodiments, the passenger seat assembly may be installed in an aircraft cabin positioned relative to and accessible from an aisle, for instance a longitudinal aisle parallel to an aircraft longitudinal axis. In embodiments, the aircraft cabin is a premium class cabin and the passenger seat assembly is a highly adjustable, premium class passenger seat assembly. In embodiments, the passenger seat assembly is configured to be positioned spaced apart from the aisle, and in some embodiments, facing and angled relative to the longitudinal aisle. In embodiments, the seat angle may be classified as oblique. In use, the passenger seat assembly is configured to decouple the seat back subassembly from its motion subassembly such that the seat back subassembly can be locked upright and the passenger seat translated forward toward the aisle. By translating the passenger seat forward, the seat pan subassembly can be positioned closer to the aisle, and in some cases in the aisle, to facilitate PRM transfer from a transfer wheelchair into the passenger seat. The present disclosure is not limited to the particular aircraft cabin shown, as passenger cabins and seat arrangements other than those shown may benefit from the elements, features of functionalities of the passenger seat assembly disclosed herein.

FIG. 1 illustrates a passenger seat assembly 100 shown in an upright position in preparation for taxi, takeoff, and landing (TTOL). The passenger seat assembly 100 includes a floor track 102 mountable to the deck, and a passenger seat 104 mounted for linear translation along the floor track 102 between a fore position and an aft position. The passenger seat 104 includes a frame subassembly 106 configured to travel back and forth along the floor track 102, a seat pan subassembly 108 mounted to the frame subassembly 106, and a seat back subassembly 110 pivotably mounted to the frame subassembly 106. In some embodiments, the seal back subassembly 110 may be pivotably mounted to the seat pan subassembly 108 such that motion of one drives motion of the other. The passenger seat assembly 100 further includes additional subassemblies and mechanism as discussed in detail below.

In embodiments, the frame subassembly 106 includes spaced upright frame members 112 configured to translate tore and aft along the floor track 102. In embodiments, the upright frame members 112 are rotationally fixed. Translation of the upright frame members 112 fore and aft along the track may be accomplished by an actuator mechanism, for instance a linear actuator 114 fixed relative to the floor track 102. Elements of the floor track 102 and frame subassembly 106 may be provided in pairs for symmetry about a longitudinal axis of the passenger seat assembly 100. In embodiments, the passenger seat assembly 100 may further include a leg rest assembly 116 rotatably attached to a forward end of the frame subassembly 106 or attached directly to the seal pan subassembly 108. In use, the seat pan subassembly 108 may be configured to adjust in tilt in conjunction with seat back subassembly 110 recline motion. Various mechanisms for accomplishing seat pan subassembly tilt are compatible for use with the passenger seat assembly 100 as disclosed herein.

When in the upright position for TTOL as shown, the seat back subassembly 110 is positioned at a steep angle near vertical, and the frame subassembly 106 is positioned proximal to the aft end of the floor track 102. As discussed below, when in the upright position for TTOL, the seat back subassembly 110 is coupled to the motion subassembly configured to drive seat back subassembly motion between the upright position and a reclined position, and in some cases a lie flat position forming a bed.

Figure 2:
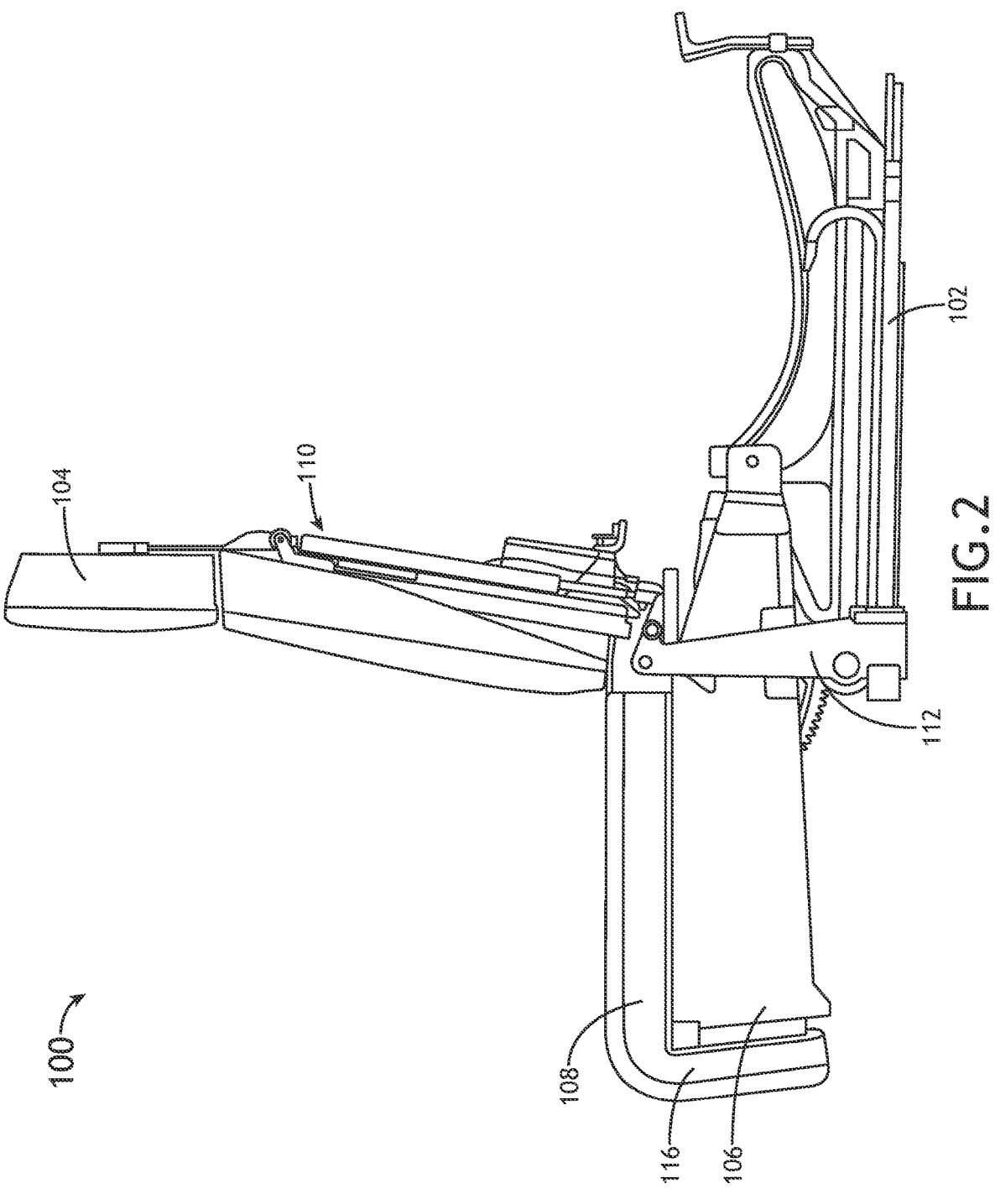
FIG. 2 is a side view of the passenger seat assembly shown in a PRM position, in accordance with example embodiments of this disclosure.

FIG. 2 illustrates the passenger seat assembly 100 in a PRM position for facilitating PRM transfer. When in the PRM position, the seat back subassembly 110 is positioned upright, and the frame subassembly 106 is translated to the fore end of the floor track 102, thereby translating the passenger seat 102 closer to the aisle. In some embodiments, the upright position of the seat back subassembly 110 is the same in each of the TTOL and PRM transfer positions. In some embodiments, the seat back subassembly 110, when in the PRM position shown in FIG. 2, may be steeper, for instance about 2° to about 5° difference between the two upright positions. As discussed below, when in the PRM position, the seat back subassembly 110 is temporarily decoupled from the motion subassembly.

Figure 3:
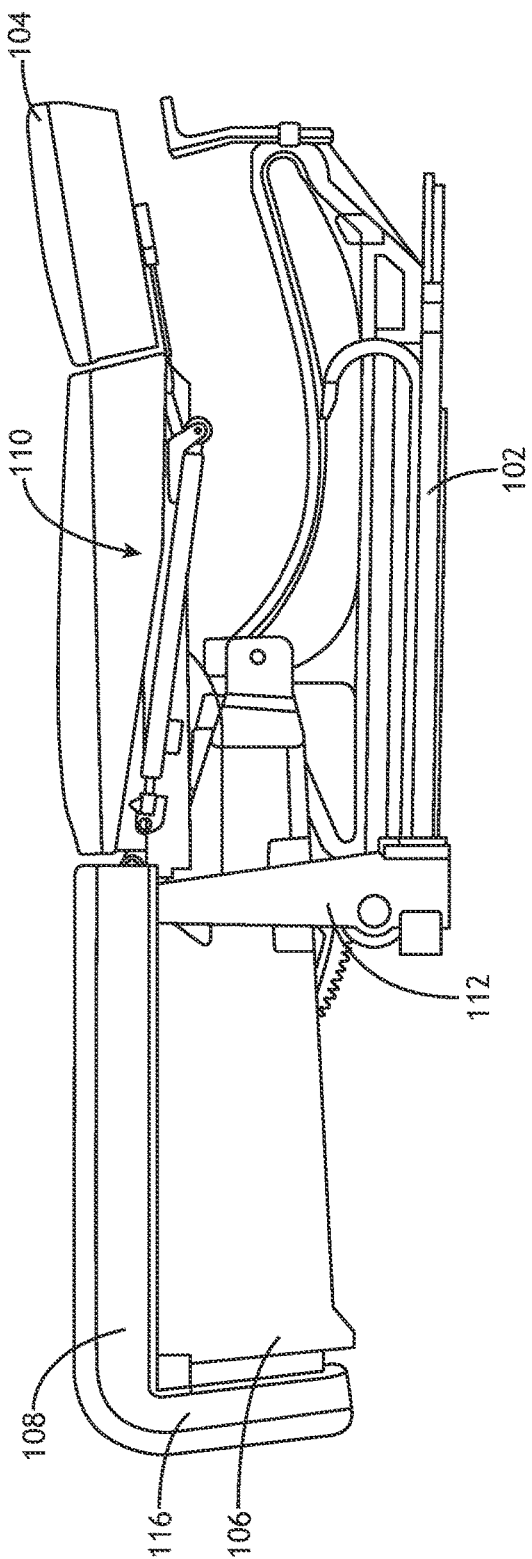
FIG. 3 is a side view of the passenger seat assembly shown in a reclined position, in accordance with example embodiments of this disclosure.

FIG. 3 illustrates the passenger seat assembly 100 in a reclined position for use during flight. The reclined position may include, but is not limited to, any seat back subassembly angle between horizontal and short of the upright position. When in the reclined position, the frame subassembly 106 may be positioned along the floor track 106 depending on the degree of recline, for instance translated to the fully fore position when the seat back subassembly 110 is rotated to fully lie flat. In embodiments, the seat back assembly 110, and in some embodiments one or more of the seat pan subassembly 108 and the leg rest subassembly, may be independently and selectively adjustable.

Figure 4:
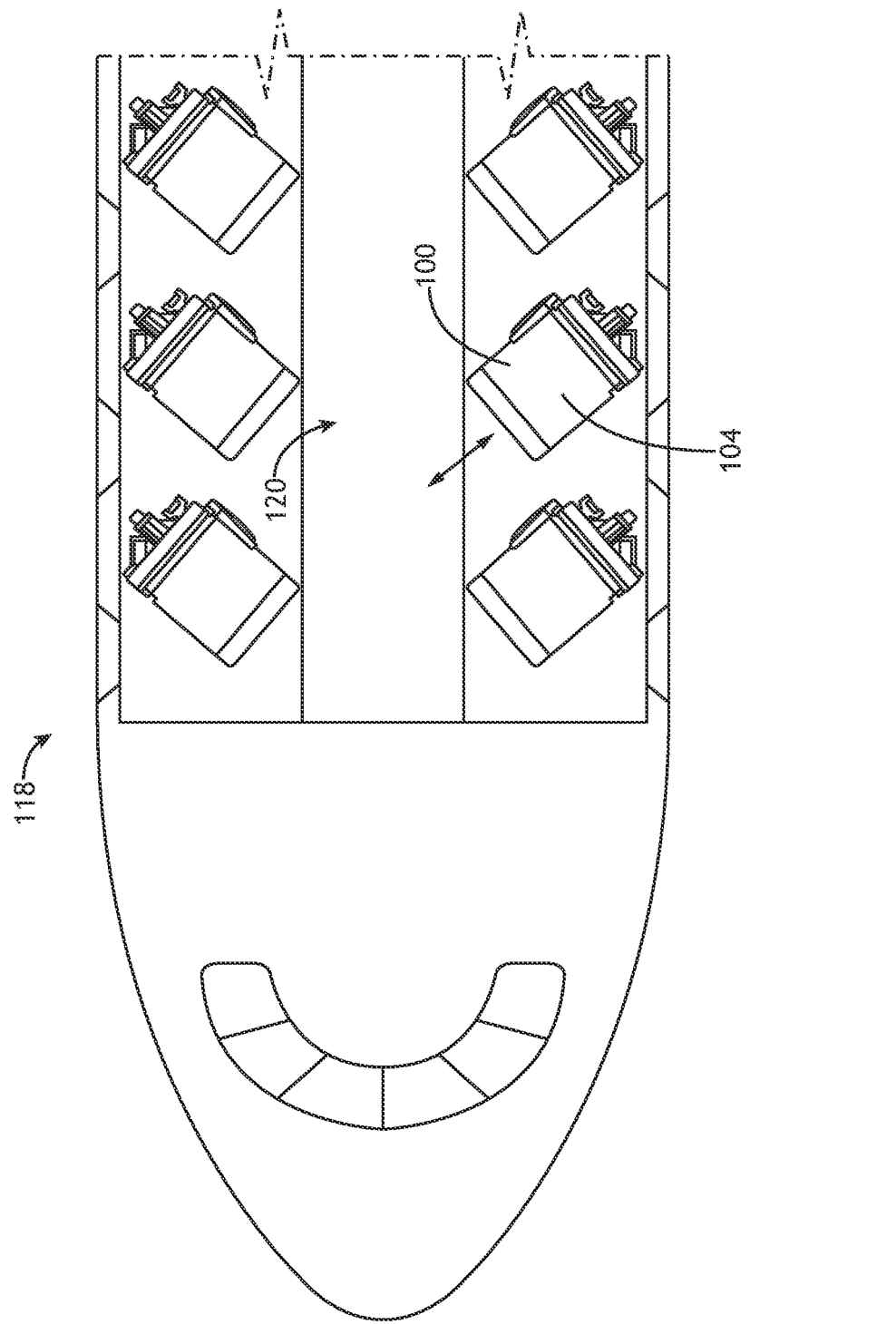
FIG. 4 is a plan view of a seat configuration for an aircraft cabin, in accordance with example embodiments of this disclosure.

FIG. 4 illustrates the passenger seat assembly 100 installed in a premium (e.g., business) class seating area of an aircraft cabin 118. As shown, the passenger seat assembly 100 is positioned facing and at an angle to a longitudinal aisle 120. In narrowbody configurations, the aircraft cabin 118 may include a single longitudinal aisle 120, whereas in widebody configurations the aircraft cabin 118 may include two longitudinal aisles 120. As discussed in detail below, in use the passenger seat assembly 100 is configured to temporarily position the passenger seat 104 nearer to the aisle 120 for PRM transfer.

Figure 5:
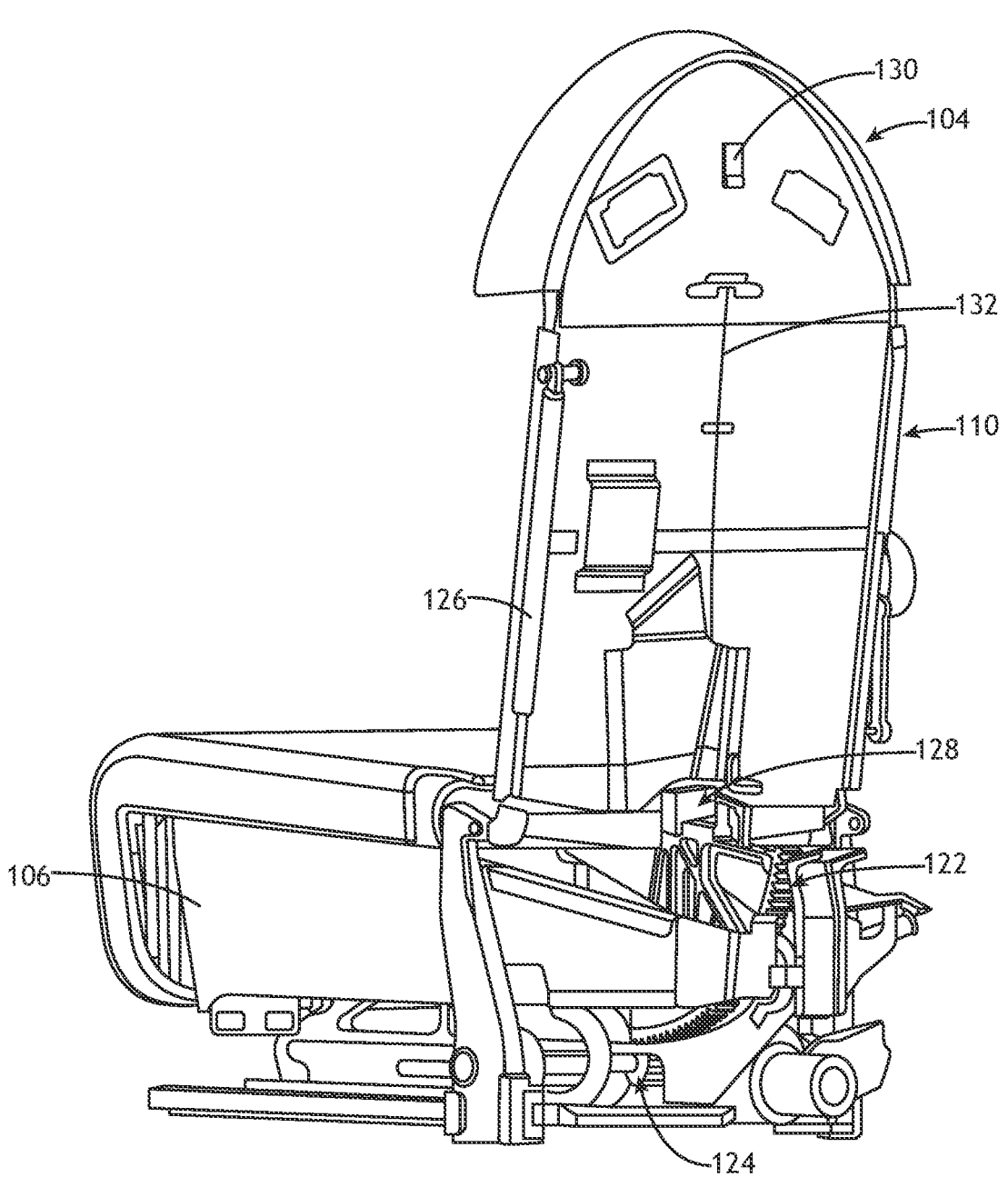
FIG. 5 is a rear perspective view of the passenger seat assembly showing seat subassemblies, in accordance with example embodiments of this disclosure.

FIG. 5 illustrates the various subassemblies and mechanisms of the passenger seat 104. A motion subassembly 122 is mounted to the frame subassembly 106 and releasably coupled to the seat back subassembly 110. In use, the motion subassembly 122 drives seat back assembly 110 motion between the upright position and the reclined position through various intermediate positions. The motion subassembly 122 includes an arrangement of meshed gears 124 and a lockable gas strut 126, among other components as discussed below.

A decoupling mechanism 128 releasably couples the motion subassembly 122 to the seat back subassembly 110. In use, when the motion subassembly 122 is coupled to the seat back subassembly 110, by the decoupling mechanism 128 being in a coupled state, the motion subassembly 122 is configured to move the seat back subassembly 110 between the upright position and the reclined position, and when the motion subassembly 122 is decoupled from the seat back subassembly 110, by the decoupling mechanism 128 being in a decoupled state, the seat back subassembly 110 is configured to be locked in an upright position and the passenger seat 104 is configured to be translated to the fore position to facilitate seating a passenger with reduced mobility (PRM). The decoupling mechanism 128 includes a release handle 130 operatively connected by cabling 132 to a latch and catch assembly as discussed in detail below. The release handle 130 may be positioned on the back of the seat back assembly 110 to be reachable by the flight crew while being concealed from view from the front of the passenger seat 104 for aesthetics and to prevent tampering.

Figure 6:
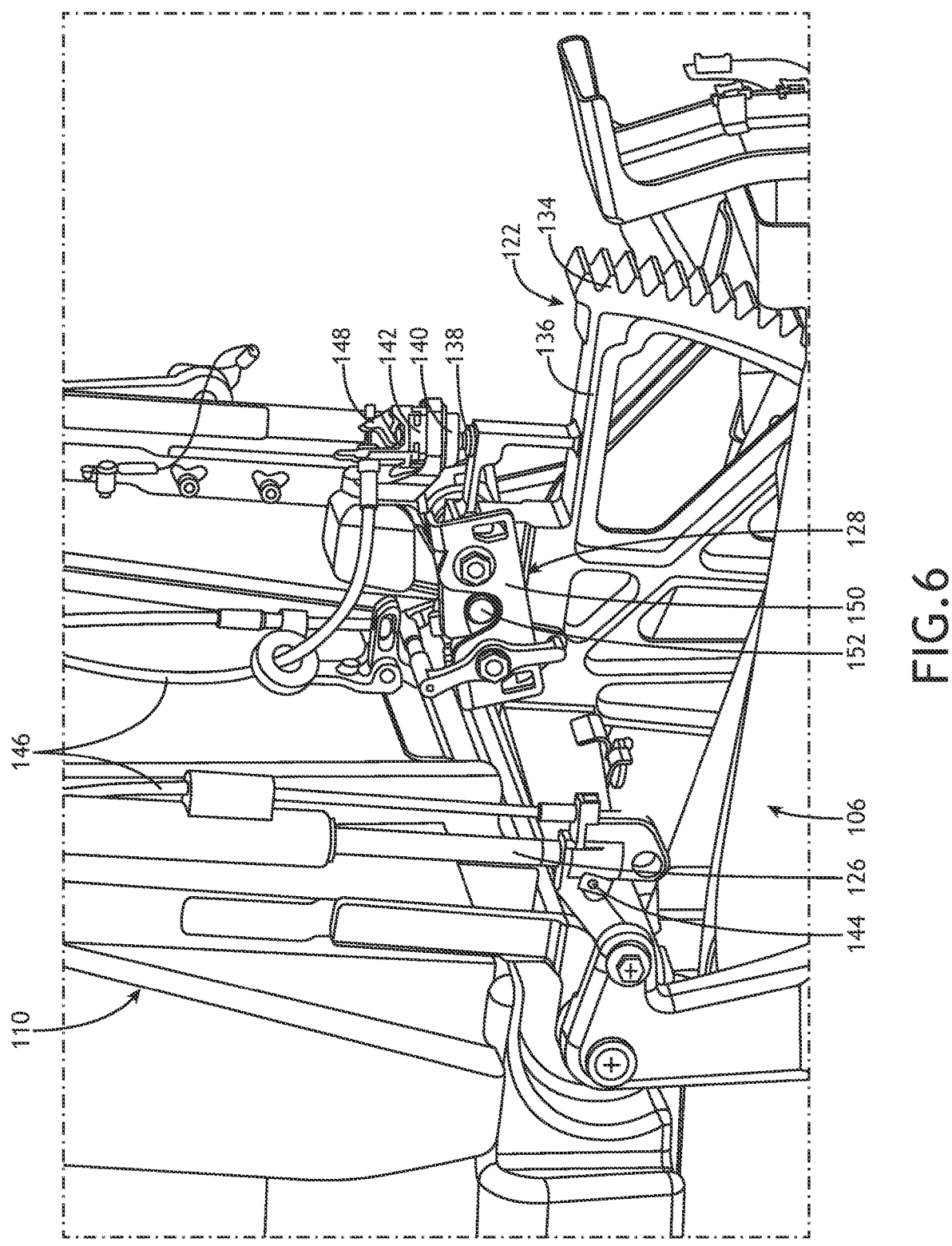
FIG. 6 is a fragmentary perspective view of the passenger seat assembly showing a decoupling mechanism in a coupled state, in accordance with example embodiments of this disclosure.

FIG. 6 illustrates features of the motion subassembly 122 and the decoupling mechanism 128, and shows the decoupling mechanism 128 in a coupled state. In embodiments, the motion subassembly 122 includes a sector gear 134 mounted to a rotatable sector wheel 136 or support rotatable mounted to the frame subassembly 106. The sector gear 134 control seat back subassembly 110 rotation and may be meshed with a drive gear configuration mounted to the frame subassembly 106. Various drive gear configurations are compatible for use with the motion subassembly 122 disclosed herein. An adjustable pin 138 is mounted to the sector wheel 136 in a position to interface with a depressible button 140 mounted for linear translation within a housing 142. The motion subassembly 122 further includes a lever 144 configured to rotate a locking pin operable for locking the lockable gas strut 126 to prevent linear translation. The lever 144 and the depressible button 140 are operably connected by a cable 146, for instance a Bowden style cable, including a translating inner wire connected at one end to the lever 144, and at the opposing end to a bell crank 148. The action of the depressible button 140 is discussed below with reference to FIG. 8.

The decoupling mechanism 128 includes a catch 150 mounted to the sector wheel 136, and a latch 152 mounted to the seat back subassembly 110. When in the coupled state as shown, the latch 152 is releasably captured or retained in the catch 150 such that the motion subassembly 122 is operably coupled to the seat back subassembly 110, such that driving rotation of the sector gear 134 drives pivoting motion of the seat back subassembly 110 and linear translation of the lockable gas strut 126 coupled between the seat back subassembly 110 and the frame subassembly 106.

Figure 7:
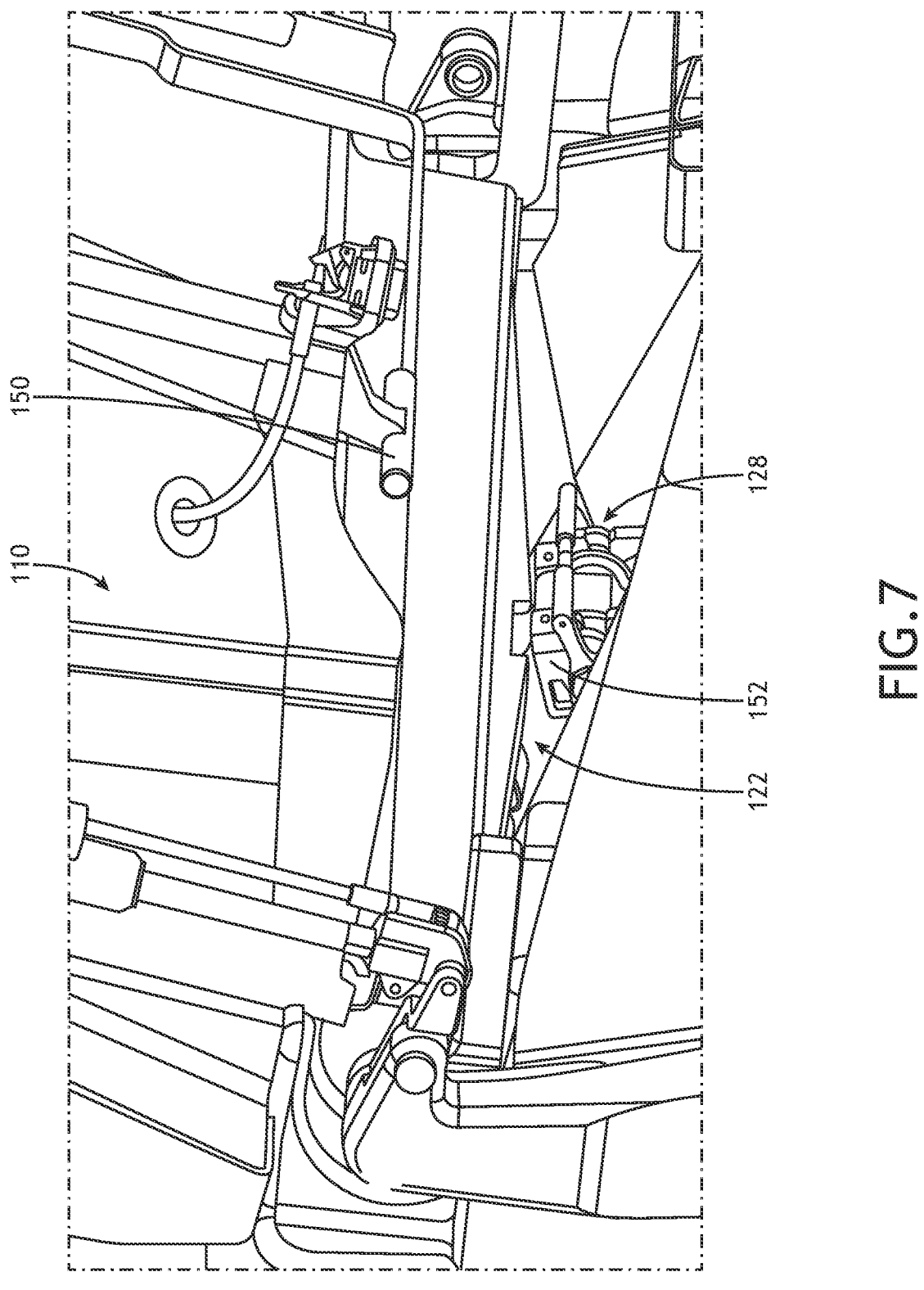
FIG. 7 is a fragmentary perspective view of the passenger seat assembly showing the decoupling mechanism in a decoupled state.

FIG. 7 illustrates the decoupling mechanism 128 in a decoupled state in which the motion subassembly 122 is detached from the seat back subassembly. When decoupled, the latch 152 is released from the catch 150 and the motion subassembly 122 is no longer able to drive seat back subassembly 110 motion. In this temporary condition, the seat back subassembly 110 can be locked in an upright PRM position. As shown, the latch 152 may be implemented as a rod mounted to or integrally formed with a frame member attachable to the seat back subassembly 110. In the decoupled state, the motion subassembly 122 may be rotated such that the adjustable pin is out of contact with the depressible button 140. FIG. 7 shows the motion subassembly 122 rotated to an exaggerated position for illustrative purposes.

Figure 8:
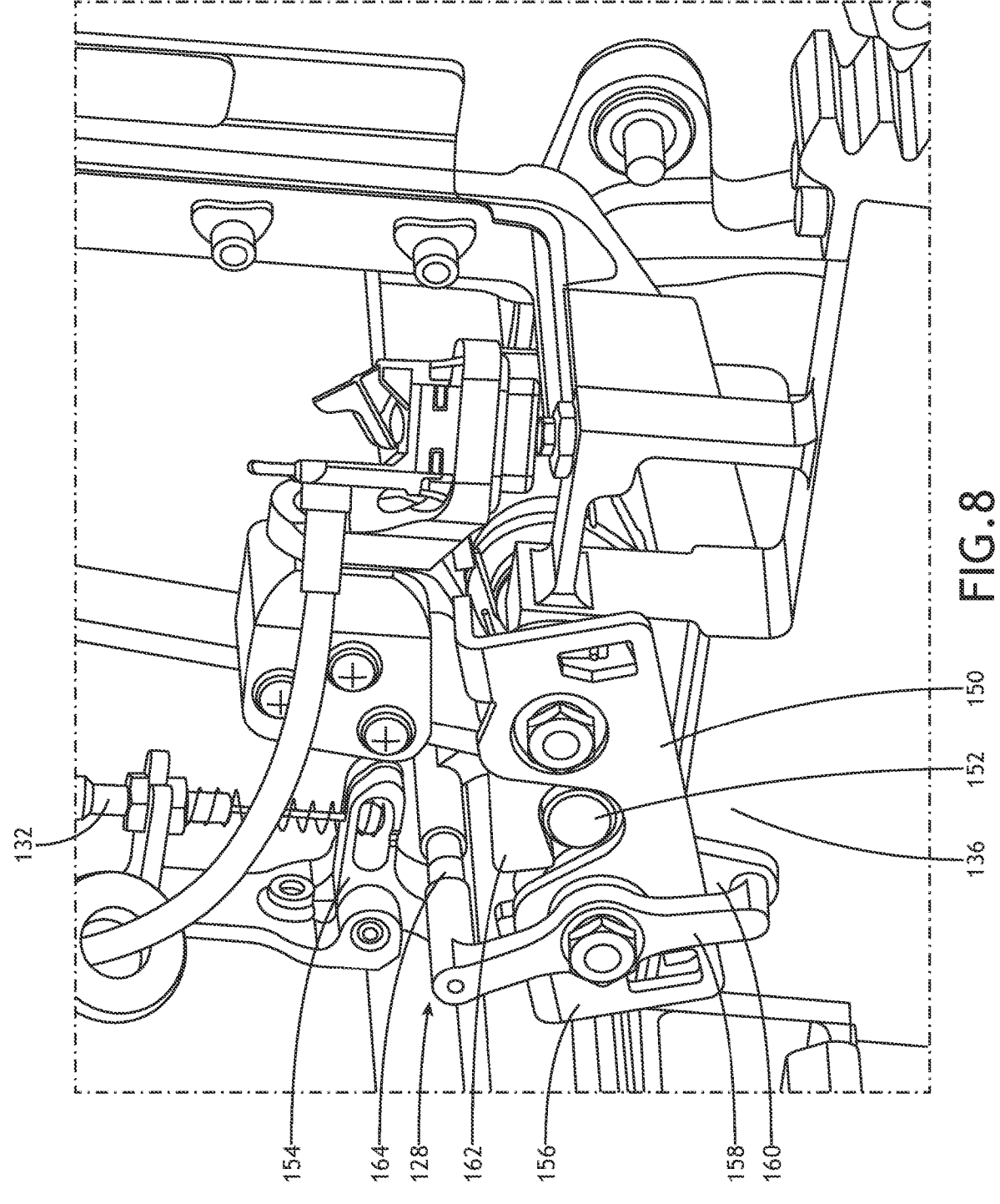
FIG. 8 is a fragmentary perspective view of the passenger seat assembly showing aspects of the decoupling mechanism and motion subassembly, in accordance with example embodiments of this disclosure.

FIG. 8 illustrates the configuration of the decoupling mechanism 128. In embodiments, one end of the cable 132 is attached to the release handle (not shown), and the opposing end of the cable 132 is attached to a rotatable lever 154, for instance a flipper arm. The catch 150 includes a bracket 156 mounted to the sector wheel 136, an external lever 158 rotatably mounted to the bracket 156, an internal rotatable lever 160 driven by the external lever 158, and an internal pawl 162 operably coupled to the internal rotatable lever 160. In some embodiments, the catch 150 may operate similar to a sear mechanism. In use, pulling the release handle (not shown) translates the inner wire (e.g., Bowden style cable) thereby rotating the rotatable lever 154. The rotatable lever 154 engages a bushing 164 thereby driving rotation of the external lever 158, which drives rotation of the internal lever 160 and ultimately causing the pawl 162 to be released to an open condition in which the latch 152 is freed. As shown, the opening into the catch 150 serves to align and guide the latch 152 into the catch 150 for releasable capture. As the latch 152 advances into the catch then pawl 162 is contacted and triggered to rotate to a closed position such that the latch 152 is retained until the next time the decoupling mechanism 128 is actuated.

Figure 9:
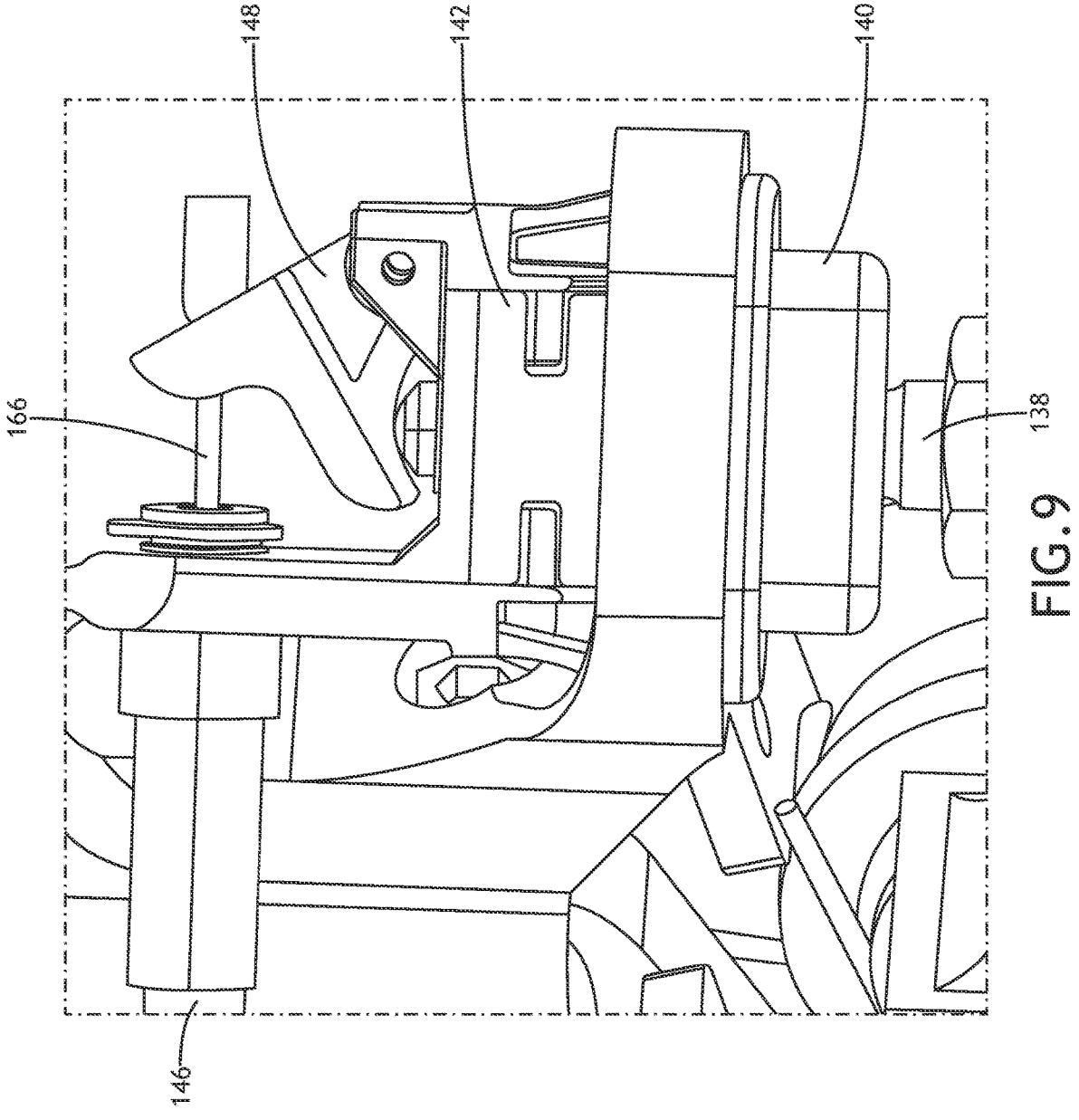
FIG. 9 is a detailed view of the depressible button portion of the motion subassembly.

FIG. 9 illustrates the configuration of the depressible button 140 assembly of the motion subassembly. The depressible button 140 is mounted in the housing 142 for linear translation and is positioned to interact with the adjustable pin 138 mounted to the sector wheel 136. The upper end of the depressible button 140 is configured to interact with the bell crank 148 connected to one end of the cable 146 attached to the lockable gas strut (not shown). In use, when the motion subassembly and the seat back subassembly are coupled together for motion, the adjustable pin 138 causes the depressible button 140 to be depressed thereby rotating the bell crank 148 to pull the translating wire 166 of the cable 146, thereby releasing a lock pin freeing translating motion of the lockage gas strut. Conversely, when the motion subassembly and the seat back subassembly are decoupled, the adjustable pin 138 is spaced from the depressible button 140 thereby extending the button, which may be biased, releasing the bell crank 148 thereby locking the locking pin associated with the lockable gas strut to prevent linear translation.

FIG. 9 shows the adjustable pin 138 (e.g., screw thread adjustment for tuning) in contact with the depressible button 140 but not yet depressing the button 140. As such, further advancement of the adjustable pin 138 in the direction of the housing 142 would cause the pressing action and consequently the bell crank action and translating wire 166 to be pulled (e.g., Bowden style cable). In embodiments, the action of the depressible button 140 and the action of the locking pin of the lockable gas strut occur in a synchronous manner.

Figure 10:
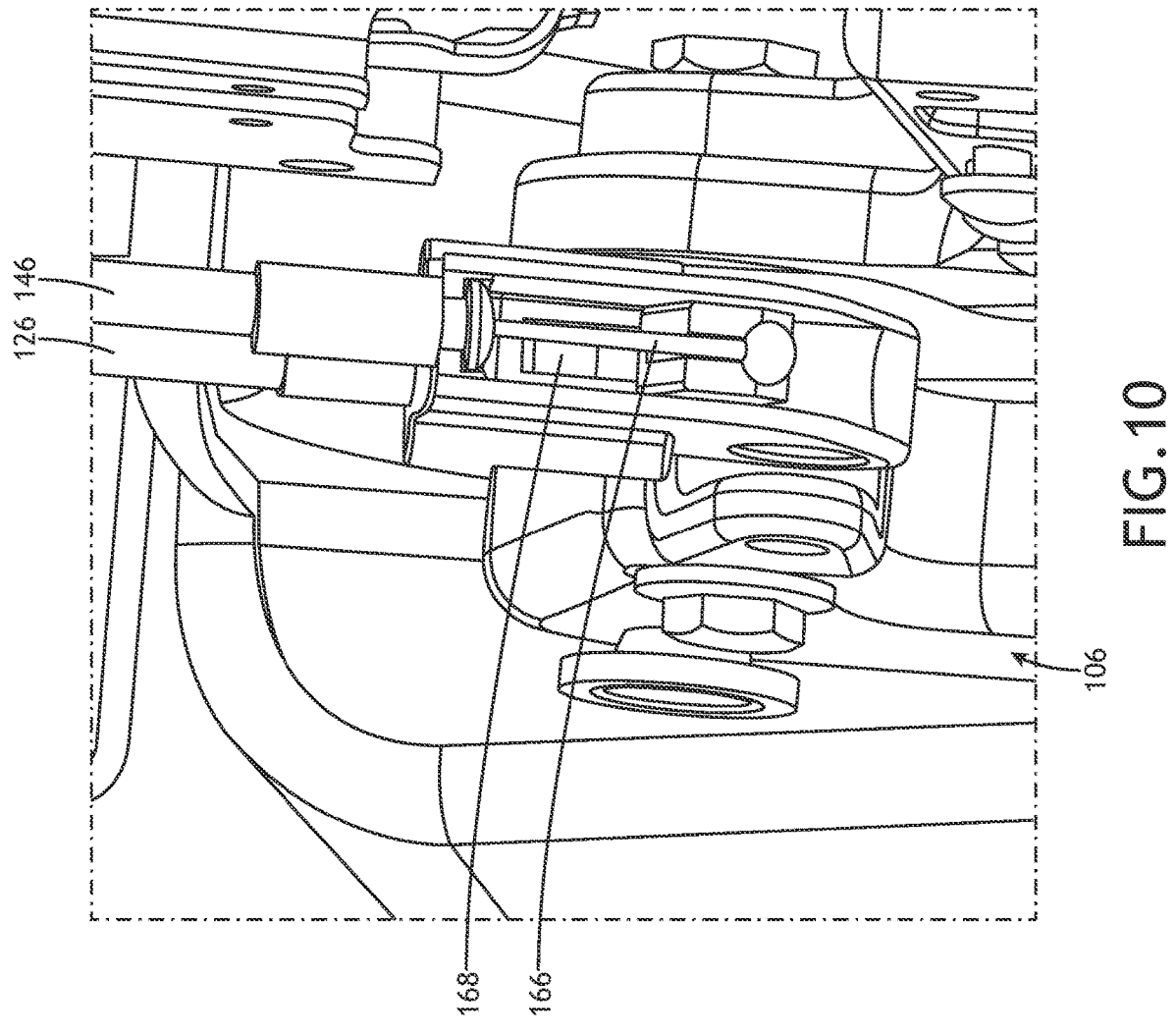
FIG. 10 is a detailed view of the operative end of the lockable gas strut, in accordance with example embodiments of this disclosure.

FIG. 10 illustrates the end of the lockable gas strut 126 pivotably attachable to the frame subassembly 106. The cable 146 may be routed along the lockable gas strut 126. The end of the internal translating wire 166 is attached to the lever 144 rotatable to move the locking pin 168 into and out of contact with the gas strut 126. When the locking pin 168 is engaged, when the wire 166 is not being pulled, the gas strut 126 is locked and prevented from translation back and forth. When the locking pin 168 is disengaged, when the wire 166 is being pulled, the gas strut 126 can translate freely as the seat back subassembly follows the sector gear. In other words, the depressed button corresponds to an unlocked strut condition in which the strut can translate freely, and the extended button corresponds to the locked strut condition in which the strut is locked against linear translation.

In embodiments, the decoupling mechanism may be actuated to decouple the seat back subassembly from the motion subassembly to lock the seat back subassembly in an upright PRM position. In some embodiments, the decoupling action may require the seat back subassembly to be pulled slightly forward while the release lever is pulled. Once locked in the upright PRM position for PRM transfer, the passenger seat may be translated forward, for instance closer to an aisle. To return the passenger seat to normal, use, the passenger seat may be translated aft, and the motion subassembly actuated to cause the adjustable pin to move into pressing contact with the button. At the same time, the latch engages in the catch and the pawl is triggered to close to retain the latch. Once the passenger seat reset to the normal use position, the coupling mechanism is returned to the coupled state and the gas strut returned to the unlocked condition ready for the next PRM transfer.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A passenger seat assembly, comprising:
a floor track;
a passenger seat mounted for linear translation along the floor track between a fore position and an aft position, the passenger seat comprising:
a frame subassembly;
a seat pan subassembly mounted to the frame subassembly;
a seat back subassembly pivotably mounted to the frame subassembly;
a motion subassembly mounted to the frame subassembly; and
a decoupling mechanism comprising:
a latch mounted to the seat back subassembly;
a catch mounted to the motion subassembly, the catch configured to retain the latch;
a release handle mounted to the seat back subassembly; and
a cable operatively connecting the release handle to the catch such that, in use, pulling the release handle causes the catch to release the retained latch;
wherein:
when the motion subassembly is coupled to the seat back subassembly, by the decoupling mechanism being in a coupled state, the motion subassembly is configured to move the seat back subassembly between a first upright position and a reclined position; and
when the motion subassembly is decoupled from the seat back subassembly, by the decoupling mechanism being in a decoupled state, the seat back subassembly is configured to be locked in a second upright position and the passenger seat is configured to be translated to the fore position to facilitate seating a passenger with reduced mobility (PRM).

2. The passenger seat assembly according to claim 1, wherein:
the frame subassembly comprises spaced upright frame members mounted for linear translation along the floor track;
the passenger seat is mounted between the spaced upright frame members; and
the seat back subassembly is pivotably mounted to the spaced upright frame members.

3. The passenger seat assembly according to claim 1, wherein the motion subassembly comprises:
a sector gear mounted to a rotatable sector wheel;
an adjustable pin mounted to the rotatable sector wheel;
a depressible button configured to interact with the adjustable pin;
a lockable gas strut coupled between the seat back subassembly and the frame subassembly; and
a cable operatively connecting the depressible button to the lockable gas strut.

4. The passenger seat assembly according to claim 3, wherein:
the cable of the motion subassembly includes a translating inner cable having a first end attached to a bell crank configured to interact with the depressible button, and a second end attached to a lever interacting with a locking pin of the lockable gas strut;

in use, pulling the first end of the cable causes the locking pin to disengage from the lockable gas strut, and releasing the first end of the cable causes the locking pin to engage the lockable gas strut; and
action of the depressible button and action of the lever occur in a synchronous manner.

5. The passenger seat assembly according to claim 3, wherein:
when the motion subassembly is coupled to the seat back subassembly, by the decoupling mechanism being in the coupled state, the adjustable pin is in contact with the depressible button and the lockable gas strut is in an unlocked state permitting linear translation of the lockable gas strut; and
when the motion subassembly is decoupled from the seat back subassembly, by the decoupling mechanism being in the decoupled state, the adjustable pin is out of contact with the depressible button and the lockable gas strut is in a locked state preventing linear translation of the lockable gas strut.

6. The passenger seat assembly according to claim 1, wherein:
the cable includes a translating inner cable;
one end of the translating inner cable is attached to the release handle, and an opposing end of the translating cable is attached to a first rotating lever; and
the catch comprises:
a second rotating lever configured to be rotated by rotational action of the first rotating lever;
a third rotating lever configured to be rotated by rotational action of the second rotating lever; and
a pawl configured to be rotated to an open position by rotational action of the third rotating lever, wherein the open position corresponds to a release state of the decoupling mechanism.

7. The passenger seat assembly according to claim 1, wherein the second upright position is equal to or more vertical than the first upright position.

8. The passenger seat assembly according to claim 1, wherein a distance between the fore position and the aft position is at least 15 inches.

9. A seat configuration for an aircraft cabin, comprising:
an aisle; and
a passenger seat assembly positioned facing and at an angle to the aisle, the passenger seat assembly comprising:
a floor track;
a passenger seat mounted for linear translation along the floor track between a fore position proximal to the aisle and an aft position distal from the aisle, the passenger seat comprising:
a frame subassembly;
a seat pan subassembly mounted to the frame subassembly;
a seat back subassembly pivotably mounted to the frame subassembly;
a motion subassembly mounted to the frame subassembly, the motion subassembly comprising:
a sector gear mounted to a rotatable sector wheel;
an adjustable pin mounted to the rotatable sector wheel;
a depressible button configured to interact with the adjustable pin;
a lockable gas strut coupled between the seat back subassembly and the frame subassembly; and
a cable operatively connecting the depressible button to the lockable gas strut; and a decoupling mechanism;

wherein:

when the motion subassembly is coupled to the seat back subassembly, by the decoupling mechanism being in a coupled state, the motion subassembly is configured to move the seat back subassembly between a first upright position and a reclined position; and when the motion subassembly is decoupled from the seat back subassembly, by the decoupling mechanism being in a decoupled state, the seat back subassembly is configured to be locked in a second upright position and the passenger seat is configured to be translated to the fore position to facilitate seating a passenger with reduced mobility (PRM).

10. The seat configuration according to claim 9, wherein:

the frame subassembly comprises spaced upright frame members mounted for linear translation along the floor track;

the passenger seat is mounted between the spaced upright frame members; and the seat back subassembly is pivotally mounted to the spaced upright frame members.

11. The seat configuration according to claim 9, wherein:

the cable of the motion subassembly includes a translating inner cable having a first end attached to a bell crank configured to interact with the depressible button, and a second end attached to a lever interacting with a locking pin of the lockable gas strut;

in use, pulling the first end of the cable causes the locking pin to disengage from the lockable gas strut, and releasing the first end of the cable causes the locking pin to engage the lockable gas strut; and action of the depressible button and action of the lever occur in a synchronous manner.

12. The seat configuration according to claim 11, wherein:

when the motion subassembly is coupled to the seat back subassembly, by the decoupling mechanism being in the coupled state, the adjustable pin is in contact with the depressible button and the lockable gas strut is in an unlocked state permitting linear translation of the lockable gas strut; and when the motion subassembly is decoupled from the seat back subassembly, by the decoupling mechanism being in the decoupled state, the adjustable pin is out of contact with the depressible button and the lockable gas strut is in a locked state preventing linear translation of the lockable gas strut.

13. The seat configuration according to claim 9, wherein the decoupling mechanism comprises:

a latch mounted to the seat back subassembly;

a catch mounted to the motion subassembly, the catch configured to retain the latch;

a release handle mounted to the seat back assembly; and a cable operatively connecting the release handle to the catch;

wherein, in use, pulling the release handle causes the catch to release the retained latch.

14. The seat configuration according to claim 9, wherein:

the second upright position is equal to or more vertical than the first upright position; and a distance between the fore position and the aft position is at least 15 inches.

15. An aircraft passenger seat assembly for facilitating seating a passenger with reduced mobility (PRM), the aircraft passenger seat assembly comprising:

a floor track;

a passenger seat mounted for linear translation along the floor track between a fore position and an aft position, the passenger seat comprising:

a seat pan subassembly;

a seat back subassembly;

a motion subassembly for driving motion of the seat back subassembly between an upright position and a reclined position; and a decoupling mechanism releasably coupling the motion subassembly to the seat back subassembly;

wherein:

when the motion subassembly is coupled to the seat back subassembly, by the decoupling mechanism being in a coupled state, the motion subassembly is configured to drive the motion of the seat back subassembly;

when the motion subassembly is decoupled from the seat back subassembly, by the decoupling mechanism being in a decoupled state, the seat back subassembly is configured to be locked in a second upright position and the passenger seat is configured to be translated from the aft position to the fore position;

the decoupling mechanism is actuated via a release lever mounted to the seat back subassembly; and movement of the motion subassembly out of contact with the seat back subassembly automatically locks the seat back subassembly in the second upright position by locking linear translation of a lockable gas strut coupled to the seat back subassembly.

16. The aircraft passenger seat assembly according to claim 15, wherein the motion subassembly comprises:

a sector gear mounted to a rotatable sector wheel;

an adjustable pin mounted to the rotatable sector wheel;

a depressible button configured to interact with the adjustable pin; and a cable operatively connecting the depressible button to the lockable gas strut.

17. The aircraft passenger seat assembly according to claim 16, wherein action of the depressible button and action of the locking pin occur in a synchronous manner.

\* \* \* \* \*